Figure 1:
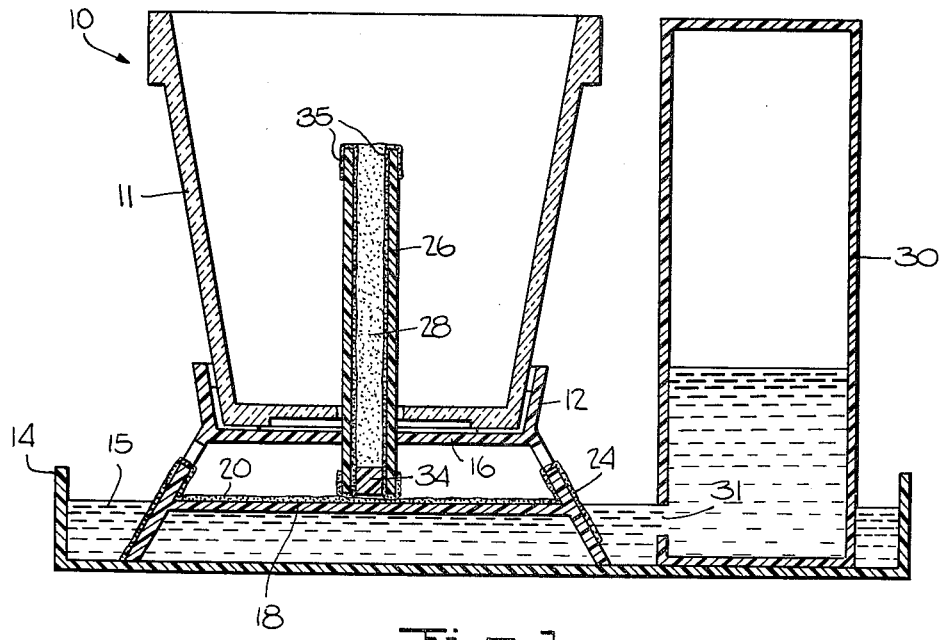

Nov. 30, 1965 E. S. GREEN 3,220,144

PLANTER

Filed March 6, 1964

INVENTOR.
EVERT S. GREEN
BY
Kenyon & Kenyon
ATTORNEYS 3,220,144
PLANTER
Evert S. Green, 14 Kenneth Ave., Bellmore, N.Y.
Filed Mar. 6, 1964, Ser. No. 350,009
6 Claims. (Cl. 47—38.1)

This invention relates to a planter and in particular to a flowerpot having means to regulate the moisture content of the soil to provide optimum moisture for plant growth.

It is generally known that there is an optimum moisture environment for plant roots. Growth will be stunted if there is either considerably less moisture or considerably greater moisture than the optimum. Too little water stunts growth, because water is needed to aid in photosynthesis and in the other metabolic processes of plants. Too much water in the soil stunts growth by reducing the amount of air in the soil; air being needed in balance with water for operation of the plant's metabolism.

The soil water which is available to the roots of plants is that portion of the water which is known as capillary water as contrasted with hygroscopic water. Essentially, capillary water is held loosely by the soil particles and will move by capilary action from moister portions of the soil to dryer portions of the soil. Thus as the roots remove capillary water from the soil directly adjacent to the roots, the capillary water further removed from the roots will move by capillary action toward the roots to maintain a supply of water to the roots. In contrast, hygroscopic water is held tenaciously by the soil particles and cannot be readily removed by the roots.

This application is addressed to the capillary water in the soil. The retention and capillary flow of water through the soil may be controlled by the extent to which the soil particles are packed together. Capillary movement increases as the soil particles are more tightly packed.

Accordingly, it is a major object of this invention to provide a plant container which will provide a controlled moisture environment for the plant roots.

It is another object of this invention to provide such a container in which the controlled moisture feed may be varied so as to be adapted to different plants.

The standard flowerpot is directly placed in a reservoir of water so that water will be absorbed by the earthenware walls of the flowerpot and also be transmitted into the interior of the flowerpot through the central opening. The water that is absorbed by the earthenware walls is then transmitted to some extent into the soil of the flowerpot but, in too many cases, does not penetrate into the center of the soil so that the center portion of the flowerpot has soil that is inadequately moist and thus becomes relatively useless to the plant and to the growth of the plant.

Thus it is another purpose of this invention to make available to the plant the benefits of the entire quantity of soil that is held by the container.

In brief, this invention involves a structure which simulates the capillary feed from a water table in nature. The soil and plant container is held on a stand over a reservoir of water. By means of a capillary feed of water through a sand path water is fed to the interior of the plant container to be there dispersed throughout the soil and perform its function of feeding the roots of whatever plant is in the container. To permit the appropriate adjustment of the rate at which water is fed into the plant container and to assure that it is fed in at a proper place, the structure described herein is employed.

This structure includes a feed tube, which is filled with sand and which extends along the central axis of the plant container from inside the container downwardly through an opening in the base of the container toward the water in the reservoir. However, a sand bed is interposed between the base of this feed tube and the water in the reservoir so that this feed tube rests on the sand bed. The sand bed, in turn, is connected to the water in the reservoir by one or more sand paths which are bonded to the stand that holds both the sand bed and the plant container above the reservoir. Thus, water flows from the reservoir along and up the sand paths to the sand bed where it flows to the base of the feed tube and then up the feed tube into the center of the plant container. This water flow is primarily by means of capillary action and the rate of water flow may be varied by varying a number of the parameters in the structure. The coarseness of the sand and the density with which it is packed will affect the rate of flow. The height of the feed paths and their width will affect the flow. A plurality of feed paths may be employed which will intercept the water in the reservoir at different water levels so that an adjustment in water level can bring into play additional feed paths and thus affect the rate of water flow.

Figure 2:
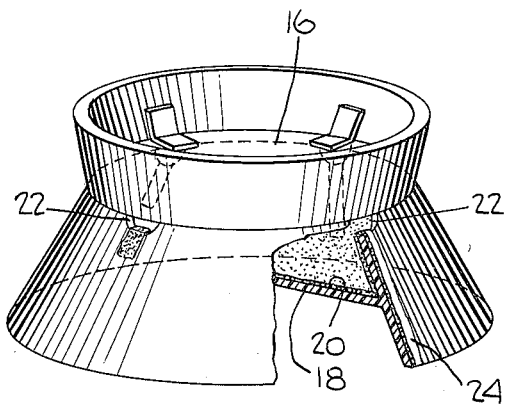

Other objects and purposes of this invention will become apparent from a consideration of the drawings and detailed descriptions in which:

FIG. 1 is a cross-section elevation of a planter embodying the principles of this invention; and FIG. 2 is a partially broken away perspective view of the stand on which the plant container sits, showing the various sand paths by which water travels from the reservoir to the sand bed.

With reference to FIG. 1, the planter 10 of this invention includes a soil and plant containing portion 11, which soil and plant containing portion 11 may be the typical earthenware flowerpot. This flowerpot 11 is set on top of a stand 12, which stand 12 is shown in perspective in FIG. 2. The stand 12 holds the flowerpot 11 above a reservoir 14 containing a supply of water 15.

The stand 12 has an upper shelf 16 which supports the flowerpot 11 and a lower shelf 18 which serves as the floor of a sand bed 20. This lower shelf 18 is above the base of the stand 12, preferably by an amount sufficient so that it is above the level of the water 15.

A plurality of ports 22 provide an opening into the interior of the stand 12. The purpose of these ports 22 is to permit having a continuous sand path from the outside of the stand 12 to the sand bed 20. This is achieved by the bonded sand paths 24 which extend down the outside of the stand 12 from the port 22 and which continue through the ports 22 down the inside wall of the stand 12 to achieve contact with the sand bed 20. The water 15 in the reservoir 14 is enabled by capillary flow to flow up one or more of the sand paths 24 into the sand bed 20.

A feed tube 26, which is packed with fine quartz sand 28, rests on the sand bed 20 and extends upwardly well into the interior of the flowerpot 11. Water which travels by capillary flow into the sand bed 20 is thus able to travel further, by capillary flow, up through the sand 28 in the feed tube 26 and then into whatever soil is contained in the flowerpot 11. By this means, water is continuously fed into the central interior of the flowerpot 11 by means of capillary flow from the reservoir 14, up a sand path 24 into the sand bed 20 and up the sand 28 that is packed into the feed tube 26. In one embodiment the tube 26 was ¼ inch in diameter.

A water tower 30 having a port 31 is employed to maintain the water level in the reservoir 14 at the desired level.

The centrally disposed feed tube 26 should extend through most of the height of the container 11 so that the moisture supplied by the tube 26 will be distributed throughout the soil in the flowerpot 11.

No drain is shown in this embodiment and the course of the water is up through the sand in the feed tube 26 out through the top of the tube 26 and then through the soil in the container 11 both downwardly and outwardly toward the walls. When the moisture hits the earthenware walls of the standard flowerpot that may be used in the container 11, that moisture will be absorbed by the walls and ultimately evaporated from the outside of the walls. One of the major advantages of this design in contrast with the prior plant containers is highlighted by the relationship between the container walls and the feed tube 26. Water that is admitted to this container 11 through the feeding tube 26 has an opportunity and, indeed is forced, to pass through the soil containing portion before it hits the wall so that it will perform its function of feeding and irrigating the roots prior to being absorbed by and evaporated from the earthenware walls. The problem posed by the prior art containers was that the moisture would be, in large part, held by the walls so that the soil within the container was inadequately moistened. In such cases, the roots would tend to seek out the walls of the container in order to absorb moisture and thus grow in an unnatural position. This invention avoids that defect of the prior art containers.

The embodiment illustrated is adapted for use with containers that are presently made in that the feeding tube 26 is built to extend through the central hole which exists in the bottom of these prior art containers 11. However, in an integrated manufacture of the entire container of this invention, certain deviations from the embodiment shown may be employed so that the feeding tube 26 is integral with the container 11. In such a case the feeding tube 26 could be made integral with the base of the container 11 and there would be no opening around the feeding tube 26.

It should also be noted that the feeding tube 26 should be impervious to water and thus made from some form of plastic so that all the water will be forced to travel to the top of the feeding tube 26 before being admitted into the soil in the container 11. However, the container 11 must be earthenware or its equivalent in order to allow moisture to evaporate out and thus maintain a water flow. A water impervious container cannot be used.

The ports 22 may be as many as desired and will depend upon the size of the container 11 and the size of the plant that is grown. However, it has been found that for most household purposes one port is usually sufficient to supply the moisture necessary to keep the sand bed 20 sufficiently moist. The water enters the port 22 and gets to the sand bed by means of capillary action up the sand path 24 which is bonded onto the outside of the stand. The larger the container, the more the number sand paths 24 required to supply the water needs of the plant.

The moisture content within the soil in the soil and plant container 11 must be kept below the total saturation point. This is achieved by regulating the rate at which moisture is admitted into the sand bed 20 and this is most expeditiously done by controlling the width and/or height of the sand paths 24. The height of the sand paths 24 can, of course, be controlled by regulating the height of the water level in the reservoir 14 around the stand 12. Initially, the height of the ports 22 in the stand 12 and the width of the sand paths 24 are determined in manufacture. In addition, it may be noted, the rate of evaporation from the earthenware container 11 walls will be a function of soil moisture and thus aids in maintaining adequate drainage.

A more comprehensive control over the rate of moisture flow into the sand bed is illustrated in FIG. 2. As this figure shows, a series of sand paths 24 leading to separate ports may be employed. Each of these sand paths extends a different distance down along the outside wall of the sand container. By regulating the depth of water in the reservoir 14 around the stand 12, it becomes possible to employ any number of the sand paths 24 for the flow of water into the sand bed 20 and thus control the amount of water that flows into the sand bed 20. The minimum water flow into the sand bed 20 is achieved by having the reservoir level extend only so high as to contact the longest of the sand paths 24. The maximum water flow is achieved by having the water level raised so that all of the sand paths 24 are contacted by the water. It should be noted that the lower shelf 18 of the stand 12 is elevated above the base line of the stand 12. This is so that the sand bed 20 can be kept at a level above the water level in the reservoir 14 to avoid saturating the sand bed. This relative position of the sand bed 20 to the water 15 is important in order to establish a more effective control over the rate at which water is admitted to the sand bed 20 and thus ultimately over the rate at which water is admitted to the soil and plant containing portion 11.

The feed tube 26 should extend nearly to the floor of the sand bed 20 (though not contact the floor of the sand bed) so that a relatively thin layer of sand may be used as a sand bed and still maintain contact with the feed tube 26. The purpose for this is so that the rate at which moisture flows can be regulated without having to wait an excessive period of time for the sand bed 20 to adjust as would be necessary if the sand bed 20 were a large mass of sand. However, the feed tube 26 should not contact the floor of the sand bed since it is necessary to maintain a path into the base opening of the feed tube 26 and that path should not be cut off by physical contact between the base of the feed tube 26 and the floor of the sand bed 20.

A plastic plug 34 with a sand layer bonded to its surface may be included at the base of the feed tube 26 simply in order to keep the sand in the feed tube 26 from falling out during disassembly and reassembly. The sanded plug 34 would be a plastic plug which has a bonded sand layer around it and since the feed tube 26 has a bonded sand layer 35 around the inside of it, the plug 34 can be fit into the tube 26 and held there by friction but not jammed in so tightly as to prevent the flow of water through the bonded sand layers between it and the interior of the feed tube 26.

Of course, many techniques may be employed, as a matter of convenience, to keep the sand within the feed tube 26. A screen of some sort could be used. This screen might even be formed of a mixture of sand and plastic to form a mass something like a plug at the base of the feed tube 26. However, this invention involves having a water path such as the particular feed tube 26 illustrated and is not to be limited by the nature of the means for retaining the sand in the feed tube 26.

To assure adequate contact between the soil in the container 11 and the water fed by the feed tube 26, the bonded sand layer 35 is extended around the upper edge of the tube 26 and a short distance down the outside of the tube 26.

It should be noted that the fact that capillary flow is relied upon will limit the height to which water can be lifted. On the average, the water can be lifted approximately six inches by means of capillary flow through fine sand. It is preferred that the distance from the sand bed to the top of the feed tube 26 should not be more than approximately four inches so as to allow a safety margin and assure a controlled water flow. In one design, it was found convenient to allot three inches to the distance along the feed line within the main container 11 and one inch to the rest of the apparatus. The planter of this invention worked adequately with an additional two inches of soil above the top of the feed line 26 so that the depth of the container 11 itself could be as much as five inches.

The height of the feed line 26 is in part a function of the particular type of plant which is to be grown. The higher the tube the better will be the circulation of water throughout the soil. However, the height of the tube that may be used will also depend in part upon the root structure of the plant and the extent to which the tube will interfere with the roots. Thus it may be desirable in manufacturing a planter according to this invention to design the feed line 26 in two sections so that a top section can be removed or added thereby varying the length of the feed line.

In most circumstances where a maximum length feed line 26 is desired, it may be necessary to use very fine quartz sand in order to obtain a full six inch capillary lift for the water.

One of the reasons better pattern circulation is obtained from a tall feed line is that once the water leaves the top of the feed line, gravity starts to pull it down. However, there is some advantage to having a somewhat dry top portion to the soil since that permits air to penetrate into the soil and thus get some air to the roots.

Although one embodiment of this invention has been described in some detail, it will be apparent that there are a number of variations which may be made without departing from the scope of this invention.

For example, in situations where very much larger containers are employed, it might be desirable to use more than one feed line 26 so as to introduce water at various places in the interior of such larger containers.

It would also be possible to employ sand paths 24 having many different configurations so as to introduce further flexibility to the selection of a rate at which water is fed to the interior of the container 11. Accordingly, it is intended in the following claims to cover all such variations in the invention as would be obvious to those skilled in the art.

The water tower 30 is shown with one port 31. A plurality of ports may be included (all but one of which is kept plugged at any one time) so that the water level being maintained can be varied to vary the number of sand paths 24 being used and thus vary water flow.

What is claimed is:

1. A planter comprising:
   a reservoir adapted to hold water,
   a soil and plant container mounted above said reservoir, said container having an opening in its base,
   a sand bed deployed below said container and above the floor of said reservoir,
   at least one sand path running from said sand bed into said reservoir whereby water in said reservoir will travel by capillary flow into said sand bed, and
   means to provide capillary flow of water from said sand bed through said opening in said base of said container into the central portion of said container.

2. The planter of claim 1 having a plurality of sand paths running from said sand bed into said reservoir, each of said sand paths extending a different distance into said reservoir, whereby the number of sand paths which will provide a path for the capillary flow of water from said reservoir to said sand bed will be a function of the level of water in said reservoir.

3. A planter comprising:
   a reservoir adapted to hold water,
   a soil and plant container mounted above said reservoir, said container having an opening in its base,
   a sand bed deployed below said container and above the floor of said reservoir,
   at least one sand path running from said sand bed into said reservoir, whereby water in said reservoir will travel to said sand bed by capillary flow through said sand paths, and
   a tube having a lower end in contact with said sand bed and extending through said opening in said base of said container so that its upper end terminates within said container, whereby when said tube is filled with sand, water will be fed into said container by means of capillary flow up said tube through whatever sand is in said tube.

4. A planter comprising:
   a reservoir adapted to hold water,
   a soil and plant container mounted above said reservoir, said container having an opening in its base,
   a sand bed deployed below said container and above the floor of said reservoir,
   at least one sand path running from said sand bed into said reservoir, whereby water in said reservoir will travel to said sand bed by capillary flow through said sand paths, and
   a substantially vertical feed tube having its lower end resting on said sand bed and extending through said opening in said base of said container so that its upper end terminates within said container, whereby when said feed tube is filled with sand, water will be fed into said container by means of capillary flow up said feed tube through whatever sand is in said feed tube.

5. The planter of claim 4 having a plurality of sand paths running from said sand bed into said reservoir, each of said sand paths extending a different distance into said reservoir, whereby the number of sand paths which will provide a path for the capillary flow of water from said reservoir to said sand bed will be a function of the level of water in said reservoir.

6. The planter of claim 4 in which said feed tube has a bonded sand layer along the inner surface of said tube and around the upper and lower edges of said tube.

No references cited.

ABRAHAM G. STONE, *Primary Examiner.*